Feb. 23, 1960   K. B. KRAL   2,925,850
APPARATUS FOR SPLICING CINEMATOGRAPH FILM
Filed Nov. 9, 1956   3 Sheets-Sheet 1

Inventor
KAREL BEDRICH KRAL, DECEASED. BY
JARMILA MARIE ZDENKA KRAL, EXECUTOR

By
Dowell Dowell
Attorneys

Feb. 23, 1960     K. B. KRAL     2,925,850
APPARATUS FOR SPLICING CINEMATOGRAPH FILM
Filed Nov. 9, 1956     3 Sheets-Sheet 2
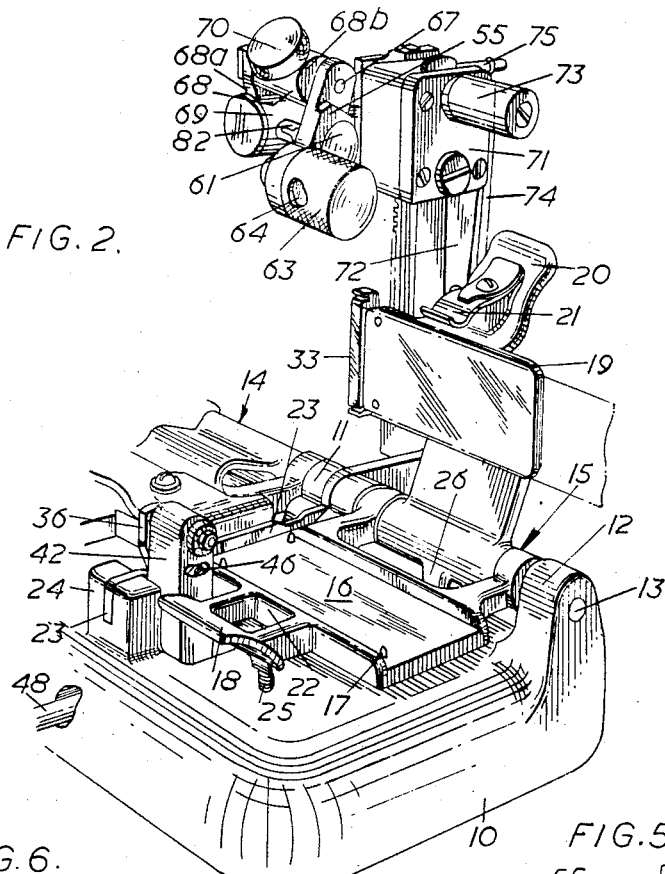
FIG. 2.
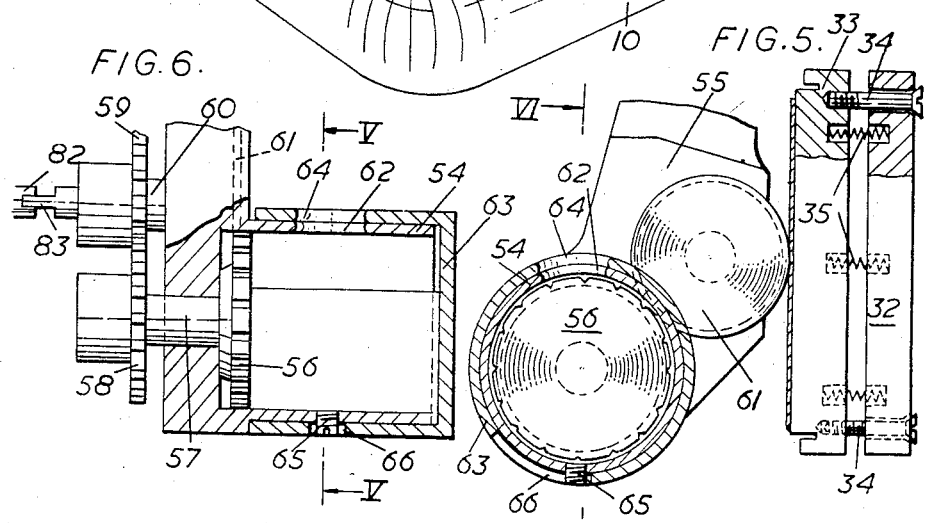
FIG. 6.     FIG. 5.
Inventor
KAREL BEDRICH KRAL DECEASED, By
JARMILA MARIE ZDENKA KRAL, EXECUTOR
By
Attorneys

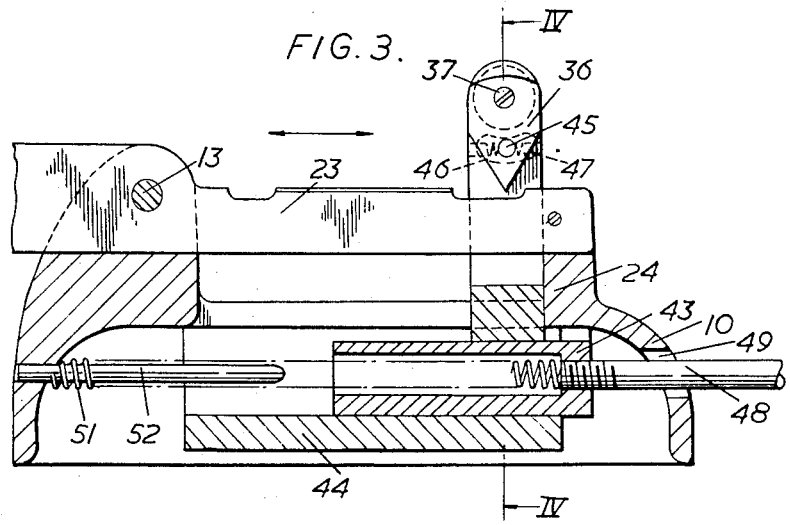
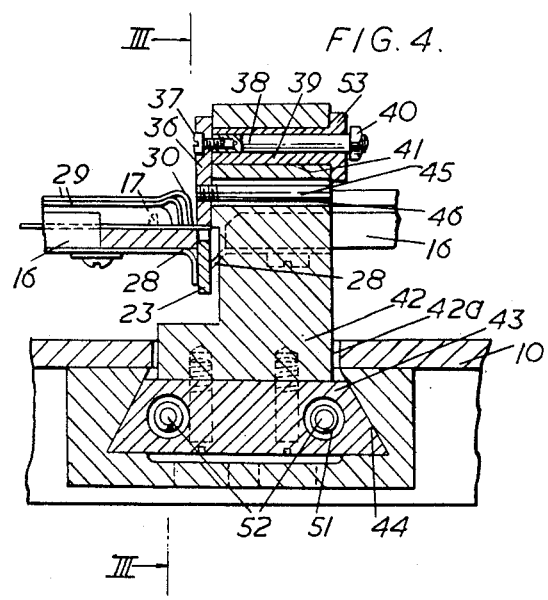

United States Patent Office 2,925,850
Patented Feb. 23, 1960

2,925,850

APPARATUS FOR SPLICING CINEMATOGRAPH FILM

Karel Bedrich Kral, deceased, late of Betsham, near Gravesend, England, by Jarmila Marie Zdenka Kral, executor, Gravesend, England Application November 9, 1956, Serial No. 621,377

4 Claims. (Cl. 154—42.1)

This invention relates to cinematographic film splicers.

For joining together the broken ends of a film, a number of operations have to be performed. First, the ends must be trimmed at right angles to the length of the film; then the base of the film near one of the trimmed ends must be bared; then adhesive must be applied to one of the ends; and finally, the two ends must be overlapped and pressed together.

Mechanical devices for carrying out some or all of those operations have been in use for a long time but all those so far available have faults of one kind or another.

The trimming operation does not present any great difficulty.

The baring of the base, however, does give some concern. It is usually effected by reciprocating a scraper across the trimmed end of one of the film portions, the depth of cut being regulated somewhat haphasardly by the pressure which is applied to the scraper. If the scraping is insufficient to remove not only the emulsion but also the substratum of the film, there is a risk that the adhesive will not effectively join the two ends of the film; if, on the other hand, the scraping is too deep and part of the base is scraped away, the film will be weakened and a weak joint be produced in consequence.

The application of the adhesive is also a matter of importance. Too little adhesive produces a bad joint. So can too much adhesive because that can lead to dissolution or distortion of the base.

It is with the considerations set out above in mind that the present invention has been developed.

The film splicer in accordance with the invention has means for trimming the ends of the film and means for stripping the emulsion and substratum from one of the trimmed ends. The stripping means comprise a scraper which is positively adjustable for depth of cut and is resiliently loaded so as to "give" to a limited extent when reciprocated across the film.

The positive adjustment of the scraper ensures accuracy in depth of cut and, above all, uniformity which is not obtainable in the hand loaded scrapers referred to above. The "give" of the scraper as it is reciprocated across the film has a number of important advantages. Thus, it prevents the scraper from biting into the film and, by taking too deep a cut, leading to excessive chattering which may seriously damage the film. The latter danger is particularly great if, as is not infrequently the case, the film has been buckled or kinked in the neighbourhood of the break. It also leads to long ife of the scrapper because, until the film has been scrapped to the full depth for which it is set, it will be trailed over the film and thus be stropped on the film.

Accordingly, the scraper in the splicer in accordance with the invention has the important merits of accuracy of operation and long life.

The splicer in accordance with the invention can also be provided with means for applying adhesive in accurately controlled quantity to the film.

In the preferred form of the invention, a supply of adhesive is carried in a container which is mounted for reciprocation on the splicer, with a disc supplied with adhesive from the container in rotating contact with the film. Such an arrangement ensures not only the application of an accurate amount of adhesive but also very uniform application.

A splicer in accordance with the invention having trimming, scraping and adhesive applying means also has the advantage over other splicers available today of being of relatively simple construction and of allowing a splice to be completed much more rapidly.

One embodiment of the invention will now be described by way of example with reference to the accompanying drawings, wherein:

Figure 2 is a fragmentary perspective view from a different direction.

Figure 3 is a section through the scraper assembly taken on the line III—III in Figure 4.

Figure 4 is a section taken on the line IV—IV in Figure 3.

Figure 5 is a detail view showing the adhesive applying means, being a section taken on the line V—V in Figure 6 and Figure 6 is a section taken on the line VI—VI in Figure 5.

Figure 1:
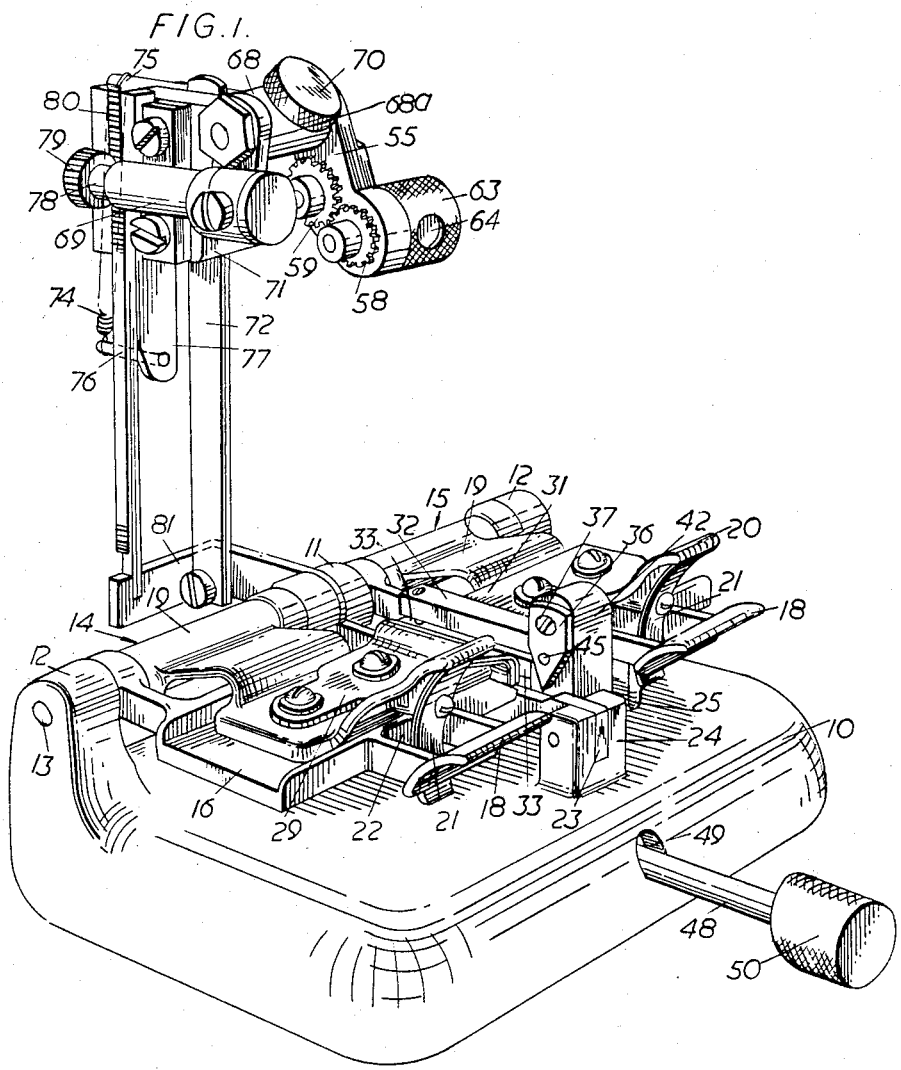
Figure 1 is a perspective view of the splicer.

The splicer comprises a base 10 having a central lug 11 and two end lugs 12 upstanding from it in which is supported a rod 13 serving as a pivot for two film-clamping assemblies 14 and 15. Each of the assemblies 14 and 15 has a base 16 of channel section provided with locating pins 17 for engagement in the sprocket holes in the film portions to be spliced and with finger pieces 18 by means of which it can be turned on its pivot 13. Each assembly also has an upper or clamping member 19 which is independently mounted on the rod 13 so that it can be swung into and out of clamping position on the film in the channel member 16 by means of a finger piece 20. Each clamping member has a spring clip 21 which can be engaged over the part 22 of its associated base member to allow the assembly to be swung on the rod 13 as a whole with a film clamped in it.

Between the two clamping assemblies 14 and 15, there is a platform 23 which is carried at one end by the lug 11 and at the other end by a lug 24 on the base 10. Stops 25 are provided on the base member for supporting the clamping assemblies so that the film ends projecting from them will lie one on the other on the platform 23.

Stops (not shown) are also provided on the base 10 against which tails 26 on the upper members 19 of the clamping assemblies can abut to hold them in the upper limiting position shown in Figure 2.

Each of the channel members 16 has a cutter 28 fixed to its under face as shown in Figure 4, each cutter lying close to one of the side faces of the platform 23. When the two portions of a broken film are to be trimmed preparatorily to being spliced, one of the clamping assemblies 14, 15 is raised to the position shown in Figure 2 and one of the ends of the film is clamped in the other assembly with its uneven edge overlying the platform 23. The raised clamping assembly is then lowered so that its cutter 28 shears off that portion of the film which lies beyond the platform. The assembly holding the trimmed film is then raised and the reciprocal operation is performed on the other portion of the film. The two assemblies then hold the two portions of the film with the trimmed ends projecting from them to the extent required to enable them to be overlapped on the platform 23.

One of the clamping members 19 has attached to it a pair of leaf springs 29 (Figures 1 and 4) having down-turned ends 30 which can be brought to bear on the protruding portion of the film to hold it down firmly on to the associated channel member 16. The other clamping member has attached to it a rigid plate 31 terminating in a block 32 located beyond the plate and vertically above the end portion of the film supported by the associated channel member. A second block 33 (Figure 5) is attached to the block 32 by means of screws 34 threaded into the block 33 and passing freely through the block 32. The block 33 is urged away from the block 32 by springs 35 for a purpose which will be described later on.

The two portions of the film to be spliced having been clamped image side up in the assemblies 14, 15 and having been trimmed as described above, they next have to be prepared for receiving the adhesive. The preparation consists in scraping the emulsion and substratum from the end of the film which protrudes beyond the springs 29 of the clamping assembly 15.

For this purpose, a scraper 36 is provided having a scraping edge of the same width as the platform 23. In the form shown here, the scraper 36 is a rigid member which is pivotally mounted to allow it to move to a limited extent in either direction out of the mid-position shown in Figure 1. It is attached by means of a screw 37 to the end of a bolt 38 which passes through an eccentric bush 39 in a bore 41 in a pillar 42. A nut 40 on the other end of the bolt 38 holds the bolt against axial movement but the scraper is free to turn on the screw 37. The pillar 42 passes through a slot 42a in the base 10 and is carried by a dovetailed slide 43 engaged in a slideway in a block attached to the underside of the base 10.

A pin 45 projecting backwards from the scraper 36 is engaged in a curved slot 46 in the pillar 42 so that the extent to which the scraper can be swung out of the rest position shown in the drawings is limited. Springs 47 located within the pillar provide a yielding resistance against such movement of the scraper. A rod 48 which is attached to the slide 43 and extends through a hole 49 in the front wall of the base and terminates in a knob 50 enables the slide to be pushed by hand across the base against the action of springs 51 mounted on pins 52 carried by the rear wall of the base and engaged in holes in the slide. The springs 51 assist in the return movement of the slide and ensure even reciprocation of the slide when the scraper 36 is traversed across the base.

The removal of the emulsion and substratum from the film must, as already explained, be effected carefully and accurately. The scraper can be positively adjusted for depth of cut by turning the eccentric bush 39, the end 53 of the bush being squared to enable the bush to be easily turned.

The scraping is effected by reciprocating the scraper by means of the knob 50 across the end of the film held in the clamping assembly 14, the clamping assembly 15 having, of course, been raised. The film to be scraped lies on the platform 23 which provides an unyielding support. When pushed across, the scraper meets the edge of the film and, to the extent allowed by the springs 47 and, ultimately, by the pin 45 and slot 46, "gives" so as to restrict the depth of cut. On its way back, the scraper "gives" in the opposite direction again making a cut of restricted depth. A few strokes of the scraper across the film suffice to remove all that it has been set to remove by the adjustment of the bush 39. The provision of a spring-mounted scraper which gives as it is reciprocated across the film ensures that the scraper will have a long life because of the stropping action which occurs between it and the film. The ability of the scraper to give also enables it to negotiate the kinks which are not infrequently found in a film in the vicinity of its broken ends. Furthermore, it prevents the scraper from attempting to take an excessively deep cut which can lead to excessive chattering and consequent damaging of the film. On the other hand, the resilient loading which opposes the movement of the scraper out of its mid-position ensures that the surface produced at the end of the scraping will not be dead smooth but will have a very slight waviness which assists the adhesive to make a good joint when, as will be described, the ends of the two film portions are spliced.

The next operation is to apply adhesive to the protruding end of the film strip in the clamping assembly 15. The means for applying the adhesive are shown in detail in Figures 5 and 6. They consist, broadly, of an adhesive container mounted so that it can be reciprocated along a vertical bar 72 carried by the base 10 and, in being so reciprocated, apply adhesive to the end of one of the film portions while the latter is being held in the clamping assembly 15 which, for the purpose of this operation, is held in its raised position shown in Figure 2.

The adhesive container is in the form of a drum 54 which is carried by an arm 55. Within the adhesive drum there is a disc 56 attached to a shaft 57 which, outside the drum, has fixed to it a toothed wheel 58 meshing with a toothed wheel 59 on a shaft 60 journalled in the arm 55. The shaft 60 also carries a disc 61 which projects into the drum through a slot in the periphery of the latter and makes contact with the disc 56.

The drum is provided with a filling aperture 62 and is fitted with a rotatable cover 63 having an aperture 64 which can be brought into and out of coincidence with the aperture 62 by turning the cover to the extent allowed by a pin 65 on the drum which lies in a slot 66 in the cover. The arm 55 is carried by a pin 67 mounted in a block 68 carried by a bracket 68a. The pin 67 is held against rotation in the block 68 by means of a key (not shown) which engages in a slot 68b in the block. The adhesive container can be adjusted laterally by sliding the pin 67 in or out of the block 68 and can be fixed in the adjusted position by a thumb screw 70. The bracket 68a is carried by a block 69 which is fixed by screws to a slide 71 mounted for reciprocation on the vertical bar 72 by means of a handle 73 against the action of a spring 74 secured between a pin 75 on the bar 72 and a pin 76 on a plate 77 attached to the slide 71. The block 69 provides a bearing for the shaft 78 of a pinion 79 which meshes with a vertical rack 80 carried by a plate 81 fixed to the base 10. At the end remote from the pinion 79, the shaft 78 is connected by bevel gearing (not shown) to a shaft 82 (Figure 6) which is slotted to receive the flattened end 83 of the shaft 60 of the gear wheel 59. A driving connection is thus maintained between the pinion 79 and the gearing 58, 59 in all adjusted positions of the adhesive container.

To apply adhesive to the film, the clamping assembly is raised into the position shown in Figure 2 and the slide 71 is reciprocated by means of the handle 73. The gear wheels 58, 59 and the discs 56, 61 are thus rotated and the disc 61 picks up adhesive and applies it to the end of the film which protrudes from the clamp and overlies the block 33. A predetermined number of strokes of the slide 71 will cause an accurately controlled amount of adhesive to be transferred to the film.

One of the film ends having been scraped and the other having had adhesive applied to it, it remains only to overlap the two ends and apply pressure to them for the splice to be completed. That is done by lowering the clamping assembly 15 so that the adhesive-coated film in that assembly is brought down on to the scraped film held by the assembly 14 and lying on the platform 23. The two ends of the film are pressed into contact with each other through the block 33 which is carried by the clamping assembly 15. The resilient mounting of that block on the block 32 ensures that the pressure is progressively and uniformly applied.

The machine described above has a number of important virtues.

First of all, it enables the film to be efficiently and expeditiously scraped. The positive and final adjustment of the scraper for depth of cut makes it possible to ensure that the whole of the emulsion and substratum is removed without removing any of the base of the film. The resilient "giving" or yielding of the scraper prevents the scraper from taking an excessively deep cut which could damage the film and, on the other hand, leads to the final production of a scraped surface which is just sufficiently wavy to provide a "key" for the adhesive. It also causes the scraper to be stropped on the film so that a keen scraping edge will be maintained for a long time.

Another important virtue is that the quantity of adhesive which is applied to the film can be carefully controlled. A predetermined number of strokes of the adhesive applying device ensures that the most appropriate quantity of adhesive is applied and the device is so constructed that the application takes place evenly over the whole length of the strip which is to be spliced.

The resilient mounting of the presser block 33 is also an important feature in that it ensures progressive and uniform application of pressure to the prepared film ends.

Those three features combine to ensure the production of a splice of very high quality and to make that quality substantially independent of the skill of the operator.

What is claimed is:

1. A film splicer having means for trimming the ends of the broken film to be spliced, a scraper mounted for reciprocation across the film for preparing one end of the film to be stuck to the other, said scraper being pivotally mounted and being loaded by a pair of springs acting on it in opposition to each other so that the scraper can give to a limited extent in both directions when reciprocated across the film, and means for positively adjusting said scraper for depth of cut.

2. A film splicer as claimed in claim 1 comprising positive stops for limiting the pivotal movement of said scraper.

3. A film splicer as claimed in claim 1 in which said means for positively adjusting said scraper comprise a support in which is formed a cylindrical hole and an eccentric bush in which the pivot of said scraper is carried and which is mounted for rotation in said hole.

4. A film splicer comprising a pair of clamping assemblies adapted each to clamp a broken film portion with the uneven end projecting therefrom and monuted for pivotal movement between a working position and an inoperative position, a cutter carried by each clamping assembly, a platform between said assemblies adapted to form a bed for the end of a film portion clamped in either of said assemblies when said assembly is in the working position, said assemblies, cutters and platform being disposed so that with one of said assemblies in the working position, movement of the other into the working position causes the cutter carried by the last mentioned assembly to trim the film portion clamped in the other assembly, scraper means mounted for reciprocation above said platform, means for adjusting said scraper means towards and away from said platform whereby to cause said scraper when reciprocated to remove the emulsion and substratum from the trimmed film portion lying on said platform, and adhesive applying means mounted for reciprocation in contact with the film portion carried by one of said assemblies when said assembly is in the inoperative position, said scraping means comprising a pivotally mounted scraper arranged for reciprocation across a film end held in one of said clamps and a pair of springs opposing pivotal movement of said scraper but permitting said scraper a limited amount of give when moved in either direction.

References Cited in the file of this patent

UNITED STATES PATENTS

| | | |
|---|---|---|
| 2,328,447 | Geyer | Aug. 31, 1943 |
| 2,677,409 | Jirouch | May 4, 1954 |
| 2,721,602 | Castedello et al. | Oct. 25, 1955 |